US00RE39470E

(19) United States
(12) Reissued Patent
Hylin et al.

(10) Patent Number: US RE39,470 E
(45) Date of Reissued Patent: Jan. 16, 2007

(54) DIGITAL INFORMATION SYSTEM

(75) Inventors: Mats Hylin, Danderyd (SE); Mats Dahlgren, Helsingborg (SE); Joakim Jonason, Lidingo (SE)

(73) Assignee: T-Rex Property AB, Danderyd (SE)

(21) Appl. No.: 09/821,969

(22) Filed: Mar. 30, 2001

Related U.S. Patent Documents

Reissue of:
(64) Patent No.: 6,005,534
Issued: Dec. 21, 1999
Appl. No.: 08/676,517
Filed: Jul. 2, 1996

U.S. Applications:
(60) Provisional application No. 60/017,403, filed on May 14, 1996.

(30) Foreign Application Priority Data

Apr. 26, 1996 (SE) ..... 9601603-5

(51) Int. Cl.

| | |
|---|---|
| ***G09F 27/00*** | (2006.01) |
| ***G09F 19/18*** | (2006.01) |
| ***G09F 15/00*** | (2006.01) |
| ***G09F 19/12*** | (2006.01) |
| ***G06F 13/04*** | (2006.01) |

(52) U.S. Cl. ..... 345/2.1; 345/2.2; 705/5; 705/6

(58) Field of Classification Search ..... 345/1.1, 345/1.2, 2.1, 2.2, 3.1, 7; 705/5, 6; 349/5–7
See application file for complete search history.

(56) References Cited

U.S. PATENT DOCUMENTS

| | | | | |
|---|---|---|---|---|
| 5,099,319 A | | 3/1992 | Esch et al. | |
| 5,404,185 A | * | 4/1995 | Vogeley et al. | 359/55 |
| 5,412,416 A | | 5/1995 | Nemirofsky | |
| 5,448,263 A | * | 9/1995 | Martin | 345/173 |
| 5,499,046 A | | 3/1996 | Schiller et al. | |
| 5,508,713 A | * | 4/1996 | Okouchi | |
| 5,565,911 A | * | 10/1996 | Ishikawa et al. | |
| 5,568,279 A | * | 10/1996 | Hinman et al. | |
| 5,634,018 A | * | 5/1997 | Tanikoshi et al. | |
| 5,642,484 A | * | 6/1997 | Harrison et al. | |
| 5,675,637 A | * | 10/1997 | Szlam et al. | |
| 5,745,688 A | * | 4/1998 | Oka | |
| 5,782,548 A | * | 7/1998 | Miyashita | 353/42 |
| 6,006,159 A | * | 12/1999 | Schmier et al. | 701/200 |
| 6,122,642 A | * | 9/2000 | Mehovic | 707/104 |

FOREIGN PATENT DOCUMENTS

| | | |
|---|---|---|
| AU | A-48849/90 | 8/1990 |
| FR | 2634295 | 1/1990 |
| GB | 2 288 474 | 8/1985 |
| WO | WO 93/16459 | 8/1993 |
| WO | WO 96/08113 | 3/1996 |

OTHER PUBLICATIONS

IBM Digital Media Distributor, IBM brochure, date unknown.

* cited by examiner

*Primary Examiner*—Bipin Shalwala
*Assistant Examiner*—David L. Lewis
(74) *Attorney, Agent, or Firm*—Pierce Atwood LLP; Kevin M. Farrell

(57) ABSTRACT

The invention relates to a digital information system (10) for displaying information on at least one display means with the aid of at least one projector (22). The exposures are presented at places accessible to and frequented by a general public. The information system (10) includes external information mediators (24) and information is controlled dynamically through the medium of a communication interface (26) and through the medium of an exposure handler in a central computer (28). The inventive system also include a communication interface (14) against an elective number of station computers (34) having connected projector computers (38) which control projectors (22) for displaying pictures or exposures. The station computers (34) and peripheral equipment are situated at mutually distanced places. According to one particular field of use, the places mentioned are subway stations (16, 18, 20) and projectors (22) project exposures or pictures onto display means positioned at selected places in the stations (16, 18, 20).

26 Claims, 1 Drawing Sheet

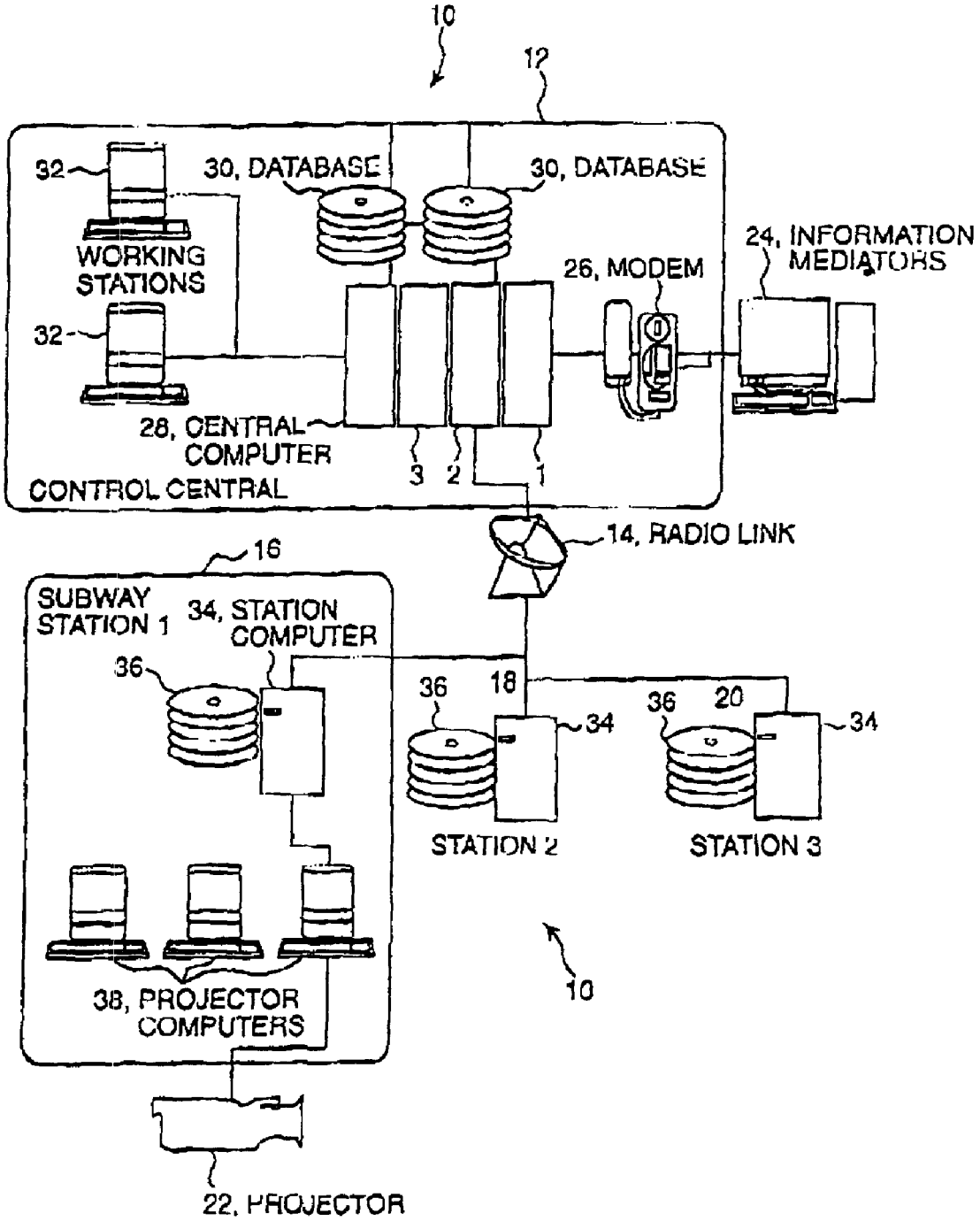
10
12
32
30, DATABASE
30, DATABASE
WORKING STATIONS
24, INFORMATION MEDIATORS
26, MODEM
32
28, CENTRAL COMPUTER
3
2
1
CONTROL CENTRAL
14, RADIO LINK
16
SUBWAY STATION 1
34, STATION COMPUTER
36
36
18
36
20
34
34
STATION 2
STATION 3
10
38, PROJECTOR COMPUTERS
22, PROJECTOR

DIGITAL INFORMATION SYSTEM

Matter enclosed in heavy brackets [ ] appears in the original patent but forms no part of this reissue specification; matter printed in italics indicates the additions made by reissue.

RELATED APPLICATION

This application claims priority to the provisional U.S. patent application No. 60/017,403 entitled "Communication System", filed May 14, 1996.

TECHNICAL FIELD

The present invention relates to a method and [to] apparatus for controlling and coordinating projectors in a digital information system for displaying information on at least one display device through the medium of at least one projector for each said device, said information being displayed in places that are accessible to and frequented by a general public. In one particular aspect, the invention is applied to control projectors for displaying information directed towards people in such places as main railway stations, subway stations, airport waiting lounges, etc.

DESCRIPTION OF THE BACKGROUND ART

Systems that are used to show information in the form of advertisements, timetable messages or arrival and departure times in present-day public service infrastructures with regard to buses, trains, subway traffic, etc., [is] *are* of a static nature. Such information is given on notice boards, posters, charts, tables, verbally through loudspeakers, and on digital displays, etc. A characteristic feature of such information media is that the information media is not coordinated, but is in the form of individual items which are controlled and updated separately, often manually.

[Modem] *Modern* digital displays used, e.g., in conjunction with subway railway traffic [gives] *give* some of the aforesaid information but [is] *are* not controlled to display advertisements, warning messages, etc. Furthermore, the information is often supplemented with verbal messages transmitted from traffic control centres. The information channel cannot be subscribed to directly for the display of external information suppliers, such as advertising bureaux, the authorities, newspapers, etc., but is processed administratively and fed manually into the information display systems.

Although the administration of information is often processed manually with the aid of modern computer technology, the available display time will nevertheless contain "dead time", among other things due to backlogging caused by the manual infeed process.

Thus, present-day systems do not enable information to be updated dynamically for display in real time. Neither do present-day systems enable external mediators to update information for display in a central control system, nor yet the administrator who makes the display of information available, but [that] it is the administrator who determines when, where and how the information shall be displayed.

The present-day static information display systems are therefore beset with a number of problems.

Also known to the art are systems for displaying or showing picture series in local public places, such as assembly halls, lecture halls, and conference rooms in industry. The systems comprise diapositive projectors which are controlled to display pictures, images and sound in an attractive manner, often with rapid picture changes and overlaps, so as to avoid the risk of boring viewers, as with conventional display with diapositive projectors. The computer control of such systems may well be both complicated and advanced. Unfortunately, these systems are nevertheless static insofar as they are used in one and the same locality and controlled and managed on the display site. The display must be planned carefully beforehand, this planning often being carried out by experts within the technical field in question, so as to obtain a finished display product. For instance, when a company wishes to change its display and introduce a new picture series combined with sound, the process again becomes static by virtue of the need to employ experts to program and arrange the new display.

The same problem as that mentioned above is also met when showing pictures through diapositive projectors in one and the same locality, because the display subscriber has very little chance of influencing the display, especially in real time. The picture display is directed towards a limited public and towards scheduled display of one and the same information material to the public concerned. The picture display is not directed to a large number of people, as in the case of a railway station platform, a subway platform or in airports. In places of this nature, it should be possible to spread the information and to display different information in different places within said stations and it should be possible to update and change the information quickly. When the information displayed on said station is not effectively coordinated, the displays on which information is presented will often become static, for instance show the time of the next display or show a pause picture, i.g. dead time. This becomes nerve-wracking to travellers, who often wait for long periods in waiting halls or stand on platforms. Neither is the failure to utilize expensive information display equipment to the highest possible degree compatible with good economy.

SUMMARY OF THE INVENTION

An object of the present invention is to provide a flexible system in which external information mediators are able to dynamically control in real time the transmission of display instructions to a larger public in different places situated at any chosen distance apart through projectors which project information onto displays intended [herefor] *therefor*.

Another object of the invention is to enable pictures, images, messages and announcements to be configured in accordance with modern digital technology, therewith providing rapid communication.

A further object of the invention is to enable a picture, image or other information to be changed in practice as often as is desired, in real time, therewith providing direct and immediate communication, and to enable similar or specific information to be displayed in places that are mutually far apart and to enable message information to be alternated with advertising spots, for instance.

According to one aspect, the present invention relates to a method of coordinating and controlling projectors in a digital information system for displaying information on at least one display device through the medium of at least one projector for each such display device, said information being displayed in places that are generally available to and frequented by a general public.

Information display subscribers are connected to a computerized control centre via computer and telecommunication interfaces for all-day-round transmission of information, wherein the control centre has a communication interface [against] *with* computerized devices situated in connection with said places for projector coordination and control.

The control centre is able to create and update a display list in real time with control instruction fields via booking information for display dynamically in time from mediators having drive routine means which are connected to the subscription and which are transparent for the transmission of information to the drive routine means of the control centre for transmission of information in the system.

The display list, which includes control instructions, coordinates and controls the projectors concerned with regard to what shall be displayed, when it shall be displayed, where it shall be displayed and for how long it shall be displayed, and causes each projector, independently of other projectors, to receive the same or different information for display through respective projectors and through the computerized devices, in accordance with the display list.

The administrator of the digital information system is able to update the display list with desired information at any time whatsoever, wherein the dynamic booking can be changed or delayed.

The projector may also interrupt display of information when the allocated display devices, or the projector, is/are visually obstructed in said public place. The projector lens can then be covered with a protective device when a dirty atmosphere is detected or anticipated and which is [immanently] *imminently* likely to dirty the lens.

In one embodiment, the [projectors] *projector is* provided with a projector computer which controls and delivers exposures to the projectors controlled by a server included in the computerized device, wherein the projector computer has a buffer memory which is filled with subsequent exposures as the exposure to be displayed at that moment via the projector is emptied from the buffer memory.

Alternatively, a server included in said computerized device is provided with a projector computer which controls and feeds exposures to the projectors, wherein the projector computer is connected to a buffer memory which is filled with subsequent exposures as the exposure current at that particular moment is displayed through the projector and emptied from the buffer memory.

A server situated in a specific place and included in a computerized device further includes databases, and information in the databases concerning exposures in the exposure list is copied in databases of servers in a selected number of computerized devices situated in other places.

In one embodiment, the exposure list may include reserved instruction fields for updating with control instructions via the mediator interface, wherein the control instructions can be placed in a waiting line, or queue, when the exposure list lacks instruction updating fields at that moment in time.

In another embodiment of the invention, a switch detects when a station computer is not functioning, wherein those projectors controlled by the station computer are controlled by another station computer situated at some other place.

A further embodiment can also be used as "feedback" and monitoring in statistical analysis by a system administrator with respect to whether or not vehicles keep to the timetable, when the display of information is interrupted either because the display device is obstructed or because the projector is obstructed. In one embodiment, the computerized devices comprise an electronic display with control computer, wherein projectors are comprised of electronic displays.

The present invention also relates to an arrangement of apparatus for carrying out the aforesaid method, said apparatus including the aforesaid devices and an exposure handler which creates the exposure list.

BRIEF DESCRIPTION OF THE DRAWINGS

The following description makes reference to the text in the accompanying drawings to provide a better understanding of the embodiments of the present invention, said drawings illustrating schematically a system for coordinating and controlling projectors in a digital information system for displaying information in accordance with the invention.

DETAILED DESCRIPTION OF PREFERRED EMBODIMENTS OF THE INVENTION

The present invention relates to a method for the dynamic coordination and control of projectors in a digital information system for displaying information on at least one display device via at least one projector for each display device, wherein the information is displayed in places that are accessible to and frequented by a general public. The invention also relates to an arrangement of apparatus for carrying out the method.

Although implementation of embodiments are limited in the following to subway railway stations, it will be understood that the invention is not restricted to these embodiments. As before, mentioned, the inventive system can be used in places where large sections of the public are known to visit, such as railway stations, airports, outdoor locations, etc., in addition to subway stations.

Preferred embodiments of the invention will now be described in detail with reference to the accompanying drawings, which illustrate schematically a system 10 for coordinating and controlling projectors in a digital information system for displaying information on display devices, such as free standing picture screens, wall-mounted screens, walls, and overhead screens or other means suitable for reproducing or exposing picture information in the form of text, stills, movable pictures, images, etc. (displays not shown in the drawing).

In the main, the system is comprised of a control centre 12 having a communication interface 14 which connects an unlimited number of computerized devices 16, 18, 20 which are placed at desired distances from one another for the control of projectors 22 whose projector images or pictures are displayed in the aforesaid public places.

The illustrated system also includes an advertising agency which is connected to the control centre 12 through the medium of a computer 24 and a modem 26. Although only one modem is shown connected to the central computer 28 of the control centre, it will be understood that modem [poles] *pools*, telephone switching centres and other similar devices may be used to this end in accordance with present-day techniques.

The central computer 28 in the control centre 12 also includes databases 30, in the illustrated case two databases. The databases 30 may be externally connected to the central computer. The control centre also includes working stations 32, which are preferably connected to the central computer 28 via a Local Area Network (LAN) in accordance with known techniques. The working stations 32 are used by the personnel serving the control centre 12, in monitoring, checking, maintaining and updating functions in the central computer with its databases. The control centre administrator is able to insert projector control instructions via the working stations, for instance when information is directed specifically to travellers and passengers traveling by ship, train, subway, aircraft or some other vehicular traffic who require specific information. The information may concern the arrival times and departure times of passenger-carrying vehicles. The administrator controls internally how, what, when or where the information shall be displayed by the projectors 22. An important feature in this context, however, is that external information mediators 24 are able to give control instructions to the projectors 22 with regard to the information that the external mediators 24 desire the system 10 to display via the projectors 22, each on its own initiative and communication-wise transparent via modems 26. This can be achieved in accordance with one embodiment of the invention without involving the working stations 32 in the procedure of transmitting the control instructions to the central computer 28.

The term information mediator (24) used in the following shall be interpreted in its widest meaning, i.e. as not only referring to advertising agencies but to all companies and private persons who wish to utilize the system 10 for commercial reasons or for the display of information that concerns a general public. At present a mediator which wishes to display information in public places is normally forced to wait about two weeks, perhaps longer, before his order can be implemented and the information publicly displayed. With the inventive digital information system 10, the information can be displayed principly in real time, i.e. at the time of making the order, possibly with a short delay due to processing, fully-booked exposure lists and other quickly passing causes. Furthermore, an external information mediator 24 is able to put through information to the system 12 twenty-four hours a day, whereupon the information can be included instantaneously in an exposure list, as illustrated in more detail below.

Those external information mediators which connect to the control centre 12 via modems are, in one embodiment of the invention, connected to the control centre via specially designed interfaces (drive routine means) for data and telecommunication. In this way, only external mediators 24 having the correct interface are able to connect transparently to the control centre 12 for delivering control instructions in the projectors 22, which avoids unauthorized access to the display of such information and misuse of the system. In this regard, the special interface, which may be included in the computers of external mediators, also includes commercially available code keys or other codes sent between the control centre 12 and the computer 24 of the external mediator to verify the right to enter control instructions into the central computer 28, without the administrator needing to supply through the working stations 32 further information or authority permitting access of the external information mediators 24 to the central computer for transmitting system transparent control instructions to the projectors 22.

In accordance with the invention, the control centre 12 has a communication interface 14 [against] *with* the computerized devices 16, 18, 20 situated on shifting positions or places for projector coordination and control.

The drawing shows specifically a radio link which forms an interface between the control centre 12 and the computerized devices 16, 18, 20, this interface being a preferred interface, although not necessarily the sole possible interface. Other interfaces for transmitting information between the control centre 12 and the computerized devices 16, 18, 20 may consist of a cable-carried ISDN solution (Integrated Services Digital Network) or other fixed lines that have the same capacity.

In one embodiment of the invention relating to subway station 1, the computerized device 16 is comprised of a station computer (server) which either includes or is connected externally to a hard disk 36, wherein the station computer 34 is connected to a plurality of projector computers 38, three such projector computers in the illustrated case, which transmit control information to connected projectors 22, only one of which is shown. The projector computers 38 have the form of PC units with picture screens in the illustrated case. The information sent to projectors 22 can be monitored on the picture screens of the PC units 35 and edited by personnel stationed at different locations within the subway station 16, or from a central location. In the illustrated embodiment, station 2, referenced 18, and station 3, referenced 20, comprise other subway stations that are equipped with devices similar to the devices of the subway station 16, although without showing the projector computers 38 and the projector 22. It is assumed, however, that these stations also include projector computers 38 and at least one projector 22.

In an alternative embodiment of the device or devices 38, i.e. the projector computers 38, *are* included in the station computer 34, the projector or projectors 22 is/are controlled directly from the station computer 34.

In yet another embodiment of the devices included in the computerized devices 16, 18, 20, the projector 22 is replaced with an electronic display (not shown), such as a large picture screen in LCD technology, light-emitting diode technology (LED technology) or the like. The station computer 34 is then included in the large picture screen or is connected externally thereto. Preferably, the projector computer 38 in the station computer 34 and the database 36 are also included. Information is transmitted from the control centre 12 generally in the same manner as that before described. However, each separate large picture screen may be addressed directly through a radio network 14, wherein the screens are controlled from the control centre 12 which includes redundancy. Thus, in the illustrated case, the computerized devices 16, 18, 20 form an electronic display with control computer 34, said projector 22 effecting the display.

According to one embodiment, the computerized devices 16, 18, 20 may include redundancy by virtue of all databases 36 of hard disks on the stations 16, 18, 20 including the same projector control information or instructions for monitoring the system in a subway station 16, 18, 20. Thus, all information is copied between the station computers 34 and their databases 36 via the communications interface 14 from the central computer 28. This means that a computerized device for displaying information in a subway station via projectors 22 will not be disabled should one or two of the stations shown in the drawing suffer a computer or hard disk power down in a station computer 34. In the event of a power down in a station computer 34, the communications interface 14 can be coupled to a switch which automatically bypasses the station computer and connect projectors 22 connected to the power down computer 34 to one of the station computers 34 that is still in function (the switch is not shown in the drawing).

The digital information system 10 has been described in the aforegoing with regard to respective hardware and interfaces. Implementation of the present invention in achieving the objects and purposes thereof will now be described more specifically.

The illustrated central computer 28 is divided into three powerful servers 1, 2, 3, of which server 1 receives material from external information mediators 24, via modems 26.

Server 2 sends information material to the station computers 34. The same material can be sent to all station computers 34, even though the information is to be displayed solely on a given display or on given displays. What shall be exposed and where it shall be exposed will be explained in more detail below.

Server 3 functions to process information and control instructions received from the information mediator 24, as described in more detail blow.

The server 3 of the central computer 28 functions partly as an exposure handler. The exposure handler 3 carries out the important object of the invention with regard to the possibility of an external mediator 24 to organize the information delivered to the station 16, 18, 20 via an exposure list, this organizing of information being effected in real time via the modem 26 and the server 1 that receives projector control information from the external mediator.

In one [invention] *embodiment* of the invention, a queue, or line, is created from the information material received by the server 1, in accordance with some known line or queuing method, such as FIFO (First In First Out), LIFO (Last In First Out) or Round Robin, etc., wherein the server 3 or exposure handler 3 has set-up or created an exposure list which covers a twenty-four hour period for information exposure or display via projectors 22. The exposure handler 3 collects and processes, i.e. allocates, information relating to projector control instructions, wherein mediator information is sorted into the exposure list in accordance with the wishes of the mediator 24 or its instructions, when available space is found in the exposure list or in alternative places in the exposure list given by the mediator. If the exposure list is completely filled with instructions, the mediator instructions to the control centre remain in the queue list in the servo 1 in readiness for later inclusion in the exposure list, in accordance with a preferred embodiment.

In one embodiment of the invention, the exposure handler 3 creates or allocates a data message (data field) including a header, a control character field, an address field, optionally at least one CRC field (Cyclic Redundancy Code), and optionally status flags which identify and are connected to the information from an information mediator 24 and filed in the exposure list in the time interval that the information shall be exposed or displayed through a projector 22. This constitutes an alternative to the insertion of the entire information bit from an external mediator 24 in a specific time interval in the exposure list, and enables the provision of an exposure list that contains much less information and which is thus easier to handle, and to accelerate transmission of the list between computers and databases included in the system.

A data message in the exposure list can be understood here as being a control instruction in an instruction field for activating projectors 22 to project information.

A data message of this kind connected to each individual information exposure enables known HASH or switching methods to find information included in the exposure time intervals in the exposure list both effectively and quickly. A First Class® server can be used conveniently for communications transmission between external information mediators 24 and the control centre 12. Each external information mediator is then able to send an e-mail with included information material in any chosen format, which provides the advantage of not needing to write in any new software for the communication transmission function. As before mentioned, the system also incorporates a safety aspect, whereby each external information mediator that has an office or when subscribes to the system must possess a coded drive means or a coded drive routine in order to connect to the control centre 12.

In order for external information mediators 24 to be able to deliver complete pictures/films, the mediator will preferably have its own versions of the software that the exposure handler 3 uses for enabling pictures/films to be introduced transparently into the exposure list without processing via the working stations 32 in the control centre 12.

In one embodiment of the invention, there is thus included an alternative to the dynamic updating of the exposure list as mentioned in the aforegoing, i.e. the external information mediators 24 which do not have access to software in the exposure handler are provided with the possibility of having their picture material or exposure material processed by personnel serving the working stations 32, wherein said personnel enter, via the working stations 32, the information that the external mediator 24 wishes to have exposed, or displayed, via projector control instructions in the exposure handler and via the exposure list created by the handler. Personnel at the working stations 32 are thus able to interrupt any queue lists in the server 1 to update the exposure list, via the exposure handler, with information generated centrally from the control centre 12 or with information that is insufficiently processed when received by the server 1 from the external information mediator 24.

In accordance with the aforegoing, external information mediators 24 that have access to the exposure program are able to deliver complete picture series/films which can be processed automatically and inserted into the exposure list, or optionally personnel administering the working stations 32 are able to pick external mediator information from the queues, or lines, and process this information so that it can be inserted into the exposure list via the exposure handler 3. In order to be able to distinguish information that must be processed via the working stations, external mediators 24 can mark or label such transmitted material with an appropriate code, so that the central computer 28 is able to identify this material and send it to working stations 32 for processing. Alternatively, e-mail is processed and registered as information which must be processed.

According to the invention, sensors may be placed in the close vicinity of projectors 22, such as to detect any obstacle that may prevent projectors 22 from displaying information on screens (not shown). These sensors are connected to projector computers 38, so as to enable said signals to be transmitted to the station computer 34. Alternatively, the sensors may be connected directly to station computers 34. The sensors are of a typical kind which detect the presence of obstacles, for instance optical sensors which detect when a light beam is broken, microphones, electromagnetic transmitters or ultrasonic transmitters having one or more receivers, etc.

When a sensor (not shown) registers the presence of an obstacle between a projector 22 and a cloth screen or some other display surface, the projector is stopped from projecting pictures during the time that the obstacle is present.

The sensor may also function to place a cover in front of the projector lens, so that dust, dirt or the like cannot come into contact with the lens.

In the present case, the display that exposes the information, e.g. a cloth screen, has a size of 4200×3000 mm, which corresponds to the surface area of a present-day large screen. The screen cloth may have a reflex foil affixed thereto, or may be coated with some other form of reflective material to enhance luminescence. The screen cloths are illuminated with an OH-projector 22 for instance, which is preferably mounted on the ceiling of a subway station with the aid of a special mounting means, wherein the optic is especially ground and/or provided with a filter for connecting optical effects, such as reflections from the surroundings and other disturbing light. The projectors 22 project the information material onto the screen cloth, wherein a cover is moved in front of the optic lens to protect the same against dust and dirt, for instance when a train enters alongside the platform.

Pictures are transmitted to displays or to exposure means digitally via a specially designed computer program.

All projectors 22 are able to show individual pictures or a collective picture via all projectors 22 simultaneously.

When the information mediator 24 is an advertising agency and the advertisements are to be displayed are in picture form, the advertising subscriber is able to buy a number of spots which are shown in the exposure list. The spots are shown, e.g., for a ten-second period, where, e.g., each sixth spot is a spot used by the transport company operating the subway, wherein this spot can be used partly for advertising purposes and partly for information purposes. The advertising subscriber may buy spots individually or in a special package, and the digital information system is able to insert a change at short notice or to operate a completely new spot. The system is thus highly flexible and enables quick changes to be made with regard to what shall be exposed on the exposure means, where it shall be exposed and when.

Computer-produced pictures or exposures are delivered by external advertising agencies/newspaper agencies, etc., for exposure, or showing, in subways for instance. The pictures are received by a control centre 12, which includes information material storage media. The control centre also decides what shall be exposed and in which order, and distributes the information material to the subway station 16, 18, 20. The control centre 12 is also able to refrain from displaying information which conflicts with "good order" or accepted morale and of a disturbing nature to the large majority of the public, possibly through the medium of working stations 32 and via control routines. The display of such information can also be prevented through the medium of the contracts signed by external information mediators 24 when obtaining an account or a subscription.

The exposures are received on respective stations by a station computer 34 (station server), wherein each projector 22 has an individual projector computer 38 which controls and feeds pictures in the projector or projectors 22. Projector computer 38 are controlled by the station computer 34. The communications interface 26 between advertising agencies and the control centre 12 is comprised of a communications modem 26, modem poles, switching centres, etc. According to the invention, the interface between the control centre 12 and the station 16, 18, 20 is comprised of a radio transmitter with receiver.

Each means for exposing, or showing, information sent from the projectors 22 can be individually controlled. The control centre 12 sends picture packets/information to the station computer 34 together with an exposure list. The exposure list includes a series of instructions as to what shall be shown, where it shall be shown, when it shall be shown and for how long, etc. The station computer 34 then provides each projector computer 38 with the material to be exposed. Thus, one and the same information material can be shown on all screens, or certain screens can be chosen for specific information display. This facility is controlled via the exposure list or, when the need is acute, directly from the control centre 12.

Those screens that are obstructed, e.g., by incoming subway trains, shall be "extinguished" during the time the train is located in the station. Synchronization in this regard is controlled by the station computer 34. This enables screens that are not obstructed to continue to receive exposure information from projectors 22.

In addition to exposing pictures in different standard formats, for instance in PICT (Picture Format), EPS (Encapsulated Post Script), TIFF (Tagged Image File Format), etc., the digital information system is also able to expose Quick Time® film, video film and transmit sound.

In one embodiment of the invention, the resolution is 1048×680 dpi, which constitutes a standard with advertising agencies for still pictures and picture sequences. The system is also able to display video film, which can now be recorded directly into a Macintosh® having a PCMCIA card (Personal Computer Memory Card International Association card). With regard to sound via a CD or some other source, the CD quality in stereo applies, 44 kHz.

The projector computer 38 informs the station computer 34 of the projector address, picture number/name, exposure duration and the time of the exposure, through the medium of function control means in said station computer. In the event of a malfunction/mains failure or a power cut, the station computer 34 reports this occurrence to the control centre 12. The central computer 28, in turn, monitors the station computers 34 at regular intervals.

The information material to be exposed, or shown, is down-loaded from the control centre 12 to the station computers 34. Because each projector 22 has its own projector computer 34, information material can be sent to the station computer 34 at any time in a calendar day without disturbing exposure on the station 16, 18, 20. When necessary, the exposure list can be changed or stopped in respect of all projectors 22 or in respect of certain projectors for showing specifically chosen information.

The computers 34 include counters which function to register, e.g. in tables or other registers, the length of time over which the information concerning each external information mediator 24 has been exposed, or shown. Thus, when so considered by an administrator, the mediator 24 need only pay for the actual time over which the information was displayed and is not required to pay a single down payment for, e.g., round-the-clock display over a seven-day period, as is at present the case.

According to one embodiment of the invention, the hardware is comprised of a number of powerful servers which form a central computer 28, said computer 28 and servers 1, 2, 3 essentially carrying out the following procedures.

The server 1 receives material from the advertising agencies, via modems, for instance.

The server 1 sends information material to the station computers 34, wherein the same information material can be sent in all stations even when the information shall be shown solely on a given screen or screens. The information to be displayed is determined by the exposure list sent to the station 16, 18, 20 with the exposure or picture material, which is effected via the server 2.

The exposure material or picture material (and other information), the exposure list, etc., are prepared in the exposure handler which is included in the server 3 in accordance with the aforegoing.

Each server 1, 2, 3 will preferably have its own array of databases 30, for instance external hard disks with sufficient storage capacity. All material is copied therebetween. This will result in redundancy, since each exposure or picture will occur in at least three copies. Copying between the databases 30, 36 can be effected automatically, with each newly arrived or changed file containing information being copied in the remaining databases.

The information material is received by respective stations 16, 18, 20 in a station computer 34 (server). The station computer 34 feeds exposures or pictures to the projector computers 38 in accordance with the exposure list. As before mentioned, this server also activates the extinguishing of a display while a subway train is located in the station and in reporting checks/malfunctions to the control centre 12.

In summary, the following hardware is required in the illustrated embodiment; three central servers 1, 2, 3 plus large databases 30, for instance three hard disks each of 27 GB. The server 1 is connected to the information mediators via modems, wherein a First Class® server is recommended with regard to promoting user-friendliness.

A number of working machines or working stations 32 are connected to the central computer 28 for controlling, communicating and processing of exposure or picture material, generating exposure lists through the exposure handler when required, and so on. Alternatively, the information mediators 24 may have their own versions of the exposure program used, thereby enabling the mediators to deliver finished picture sequences/films transparently. These picture sequences/films need not then be prepared in the control centre 12, but can be filled dynamically in the exposure list by the exposure handler.

The illustrated embodiment also includes a radio system which includes a transmitter and a receiver for each station 16, 18, 20, wherein at least two channels will preferably be made available, one channel for transporting exposure or picture material and one channel for communication with the control centre 12. This obviates the need of interrupting picture transmission from the control centre 12 in order, e.g., to enter emergency messages or for entering check reports from the station computers 34.

The station computers 34 are responsible for communication with the control centre 12 and supply the project computers 38 with information material or exposure material and handle control routines in the stations 16, 18, 20. The projector computers 38 deliver pictures to the projectors 22 and monitor the function of the projectors. In this case, the exposure information for the pictures can be led from the station computer 34 in packets. When a packet has been exposed, it is erased to make room for the next packet. Alternatively, there can be used a computer 34 that has sufficient capacity to store all pictures that are to be exposed. This assumes, however, that the entire picture stock shall be fed out in sequence, which is all too time-consuming to be realistic with present-day communication systems, although it may well become a reality in the near future.

Starting from the presumption that a picture or exposure may not be larger than 10 MB and that ten percent of the material is updated daily, there would be required a communication system that can handle transmission speed of at least 1.75 MB/minute. Although a cable-carried solution such as ISDN, which in a four-channel version manages two MB/minute, or fixed lines of the same capacity as an alternative to radio transmissions, such systems are at the moment enormously expensive to run, since the channels must be open all day round, meaning that at present radio transmission is a cost-effective method with regard to the communications interface 14.

The transmission rate of present digital information systems corresponds to 100 Mbits/s, in parity with new Ethernet® solutions. This is preferred for the inventive solution, and a ready developed Ethernet® solution can be used on the stations 16, 18, 20 between the station computer 34 and the projector computers 38.

One assumption in this regard is that all computers 32, 38 are able to handle PCI Ethernet® cards (Personal Computer Interface), which is the case with all new Power Macintoch®.

100 Mbits Ethernet® assumes ideal conditions with minimum disturbing or interfering magnetic fields, optimal cables, no abrupt swings with the cables, etc. Such factors seriously disturb and reduce the transmission rate. Despite these obstacles, the actual brake block is the own central SCSI bus (Small Computer System Interface) of the projector computer 38 to which the projector 22 should be connected. The transmission maximum of present-day SCSI busses is about 5 7 MB/s. This means that two seconds are required to move a picture or exposure of 10 MB from the station computer 34 to the projector computer 22.

The fastest Mactintosh® servers at present manage clock frequencies, with accelerator cards, of about 160 MHz. This is sufficient to divide up a Quick Time® film or video film in real time, for instance. The computers also have a built-in stereo, 44 kHz, which produces sound of CD-quality. Naturally, CD rom and Audio CD and, e.g., Kodak® photo CD can be used in the system. On the basis that pictures or exposures have, on average, a size of 10 MB, 2500 exposures will require 25 GB storage media. External disks can be used to this end, for instance. This large storage capacity is primarily only required for the control centre 12. The station computer 34 may have a smaller storage capacity and is supplied with fresh material during the day. This letter is effected by virtue of the function control reporting to the control centre 12 when a picture has been shown, the nature of the picture, where the picture was shown and for how long. The picture is then erased. When fewer picture remain, the control centre 12 automatically sends the next picture or exposure packet. This method enables the projector computer 22 to work effectively with a still smaller storage capacity. On the other hand, the projector 22 is equipped with a buffer memory for at least two pictures or exposures. When a picture or exposure has been shown, the picture or exposure is scrapped and leaves room for the next picture, this picture being sent from the station computer 24 during the time that picture number 2 is exposed. This avoids a two-second delay that would otherwise occur in transmission, in which case the screen would be blank or switched off during this time period.

Present-day Power Macintosh® servers manage these requirements. However, the development of server performance is advancing at great speed, and it is therefore to be expected that servers having still better performances will be available within a year.

Alternative servers 1, 2, 3 are SUN® servers or an Alpha® from Digital®. Although these servers operate under UNIX® and Windows® respectively, this does not affect the users, who are able to work under MAC OS®. A further important resource for the future is the Apple® system Copland® which is expected to be made commercially available this year. The most important advantages consist in multitasking and open transport. For instance, multitasking permits copying to several different servers at the same time as another program is processed. Consequently, when the server is sufficiently powerful, only from one to two servers is required in the control centre 12, instead of three servers 1, 2, 3 as is now the case.

Furthermore, a server is able to serve the exposure means, screens, cloths, wall surfaces of an entire station, and the projector computers 38 can therewith be omitted, this being included in an alternative embodiment of the present invention as before mentioned. Open Transport permits communication via modems with several users connected to the same computer.

For achieving a purposeful digital information system according to the present invention, there is used to this end specifically developed software, which will not be described in more detail here.

There are available at present programs such as Powerpoint® and similar programs, which will not function effectively for three reasons. The programs are very large and load the computers unnecessarily. These programs also contain a large amount of resources that are not required to show pictures or exposures. For instance, advertising exposure also differs greatly from picture or exposure presentations of the Powerpoint® type. Powerpoint® thus lack resources that advertising agencies may wish to use. Primarily morphing, which is used progressively more often in advertising programs, for instance in television broadcasting. Morphing is a process in which the image of one object is smoothly changed into that of another object, for instance human beings to animals and/or vice versa. It must be possible to present the picture sequences to be shown in a manner more interesting than solely a diapositive presentation, this being one of the objects achieved with the invention. This touches on the border region between still pictures, moving pictures and film where the methods overlap one another. It is also probable that external mediators 24 of picture or exposure presentation, will use sound. It is therefore wiser to write specific software which includes those resources that external mediators 24 desire, i.e. cultivate software. It will also be easier to update an own developed program with own resources at a further date.

In this way, the external mediators 24 do not need to bind themselves to the use of the Powerpoint® format. They simply deliver pictures in desired formats. However, it may be necessary to limit the size of a picture or exposure.

In order to achieve the inventive digital information system, it is necessary to provide a number of drive routine means, such as communication drive routine means for transferring information between external mediators 24 and the control centre 12, copying means for copying to the various databases 30, 36, drive routine means for composing the picture or exposure material to be shown, exposure handlers, drive routine means for a radio network, control means in the station computer 34 which feed pictures or exposures to the projector computers 38 in accordance with the exposure list, function control means in the projector computers 38, and in the station computers 34, drive routine means whicih interrupt a display when the display screen is hidden from projectors 22, and drive routine means for projectors 22. Effective programs exist for copying between the different databases, for instance Retrospect®.

The drive routine means which interrupts the showing of exposures when the exposure means is hidden from the projector 22, or vice versa, can also be used as feedback and monitoring in statistical analyses of the subway administrator in the present invention as to whether or not trains are running in accordance with the timetable, this being of interest for drawing up the exposure list and future updating of said list, among other things. This is effected by registration in the station computer 34 when a picture or exposure showing is interrupted. Registration may be effected, for instance, via brake routines for the computer 34. The registration may also trigger a clock (counter, timer) to register the time during which a vehicle obstructs the screen or the projector 22 respectively.

It will be understood that the aforedescribed embodiments of the present invention are not intended to limit the scope of the invention, but are merely intended as preferred modes of carrying out the invention. The invention includes other embodiments apparent to the person skilled in this art from the scope of the following claims.

We claim:

1. A method of dynamically coordinating and controlling projectors in a digital information system to display [information] *material* in public places on at least one display device, said digital information system including a computerized control center having a plurality of communication interfaces, a plurality of computerized devices situated in proximity to said public places and being connected to said control center wherein each of said *computerized* devices controls at least one projector, and *communications drive routine means for permitting* at least one [subscribing] *external* information mediator [having communications drive routine means for] *to* selectively and transparently [connecting] *connect* to said control center, said method comprising:

receiving, by said control center, display information transmitted by said *external* mediators at any time, said display information including booking information, specified by said at least one *external* mediator, for reserving and controlling a time-period to display said display [information] *material*;

generating, organizing, and dynamically updating an exposure list in real time, by an exposure handler included in said control center, in accordance with said display information, said exposure list also containing projector control instructions based on said [reservation] *booking* information;

coordinating and controlling select ones of said projectors by said computer devices, in response to said projector control [instruction] *instructions* contained in said exposure list, in order to display said display [information] *material* on said display device in real time, wherein said display information in said exposure list specifies a content of display, a location of display, a timing of display, and a duration of display [such that said content, said location, said timing, and said duration are capable of being independently selected], and said exposure list enables each of said select projectors to independently and instantaneously receive said display information through said computerized devices.

2. The method of claim 1, further including a system administrator for updating said exposure list with elective information at any time.

3. The method of claim [2] *1*, wherein said coordinating and controlling includes interrupting said display of [information] *material* by said select projectors when said display is hidden, obstructed, or otherwise visibly unavailable in said public place.

4. The method of claim [3] *1*, further including shielding lenses of said select projectors from dirt with protective devices.

5. The method of claim [4] *1*, further including coupling said select projectors to a projector computer for controlling and feeding said display information to said projectors begin controlled by a station computer included in said computerized devices, said projector computer having a corresponding [memory] buffer *memory* for accommodating subsequently arriving display information while display information of a current display is erased from said buffer memory.

6. The method of claim [4] *1*, further including a projector computer included in a station computer within said computerized devices for controlling and feeding display information to said projectors, said projector computer having a corresponding [memory] buffer *memory* for accommodating subsequently arriving display information while display information of a current display is erased from said buffer memory.

7. The method of claim 6, further including databases within said station computer situated in one of said public places, said databases include display information contained in said exposure list, said [exposure list] *contained* information capable of being copied into databases of other selected station computers situated in other public places.

8. The method of claim [7] *1*, further including a plurality of reserved instruction fields in said exposure list for updating display information with said control instructions received from said *external* information mediators via one of said communication interfaces.

9. The method of claim 8, further including placing said control instructions in a queue when said exposure list lacks instruction fields for updating said [control instructions] *display information*.

10. The method of claim [9] *1*, further including implementing a detector for determining whether a station computer [(34)] is nonfunctional in order to enable projectors being controlled by said nonfunctional station computer to be remotely controlled by a station computer situated at a different public place.

11. The method of claim [10] *3*, wherein said interrupting of display is used for monitoring by a system administrator to determine whether vehicles are running according to a schedule.

12. The method of claim [11] *1*, further including an electronic display with a control computer for each of said computerized devices such that said select projectors supply [information] *material* to be displayed on said electronic display.

13. A system for dynamically coordinating and controlling projectors to display digital [information] *material* on at least one display device in public places, said system comprising:

a computerized control center for processing [said] display information and having a plurality of communications interfaces to support data transmissions, said control center including an exposure handler for generating, organizing, and dynamically updating an exposure list in real time in accordance with said display information, said exposure list also containing projector control instructions based on said display information;

*wherein* at least one *external* information mediator [for transmitting said display information to said control center at any time, each of said mediators being] *can* electronically [coupled] *couple* to said computerized control center via one of said communication interfaces and selectively and transparently [connecting] *connect* to said control center through a communications drive routine means *to transmit said display information to said control center at any time*, said display information including booking information, specific by each of said *external* mediators, for reserving and controlling a time-period to display said display [information] *material*;

a plurality of computerized devices, situated in proximity to said public places, for coordinating and controlling select ones of a plurality of projectors in response to said projector control instructions, each of said computerized devices being electronically coupled to said computerized control center via one of said communication interfaces; and wherein said display information in said exposure list specifies a content of display, a location of display, a timing of display, and a duration of display [such that said content, said location, said timing, and said duration are capable of being independently selected], and said exposure list enables each of said select projectors to independently and instantaneously receive information through said computerized devices.

14. The system of claim 13, further including a system administrator, capable of updating said exposure list with effective information and any time.

15. The system of claim [14] *13*, wherein said select projectors interrupts said display of [information] *material* when said display is hidden, obstructed, or otherwise visibly unavailable in said public place.

16. The system of claim [15] *13*, further including protective devices to shield lenses of said select projectors from dirt.

17. The system of claim [16] *13*, wherein said select projectors are coupled to a projector computer which controls and feeds said display information to said projectors controlled by a station computer included in said computerized devices, said projector computer having a corresponding [memory] buffer *memory* for accommodating subsequently arriving display information while display information of a current display is erased from said buffer memory.

18. The system of claim [16] *13*, wherein a station computer included in said computerized devices is provided with a projector computer which controls and feeds display information to said projectors, said projector computer having a corresponding [memory] buffer *memory* for accommodating subsequently arriving display information while display information of a current display is erased from said buffer memory.

19. The system of claim 18, wherein said station computer is situated in one of said public places and includes databases with display information contained in said exposure list, said [exposure list] *contained* information capable of being copied into databases of other selected station computers situated in other public places.

20. The system of claim [19] *13*, wherein said exposure list includes a plurality of reserved instruction fields for updating display information with said control instructions received from said *external* information mediators via one of said communication interfaces.

21. The system of claim 19, wherein said control instructions are placed in a queue when said exposure list lacks instruction fields for updating said [control instructions] *display information*.

22. The system of claim [21] *13*, further including a detector for determining whether a station computer is nonfunctional in order to permit projectors that are controlled by said nonfunctional station computer to be remotely controlled by a station computer situated at a different public place.

23. The system of claim [22] *15*, wherein said display [information] interruptions are used for monitoring by a system administrator to determine whether vehicles are running according to a schedule.

24. The system of claim [23] *13*, wherein each of said computerized devices include an electronic display with a control computer such that said select projectors supply the [information] *material* to be displayed on said electronic display.

*25. A method of selectively displaying digital information at one or more of a plurality of locations, said method comprising:*

*receiving control instructions from at least one external information mediator;*

*using said control instructions to generate an exposure list, said exposure list specifying three or more of the following items:*

*i) what information content is to be displayed;*

*ii) at which of said plurality of locations said information content is to be displayed;*

*iii) when said information content is to be displayed for each location at which content is to be displayed; and*

*iv) how long said information content is to be displayed for each location at which content is to be displayed;*

*displaying images at one or more of said locations in accordance with said exposure list; and*

*permitting said exposure list to be dynamically updated.*

*26. A system for selectively displaying digital information at one or more of a plurality of locations, said system comprising:*

*a computerized control center having a plurality of communication interfaces for receiving control instructions from at least one external information mediator, said computerized control center including means for generating and dynamically updating an exposure list from said control instructions, said exposure list specifying three or more of the following items:*

*i) what information content is to be displayed;*

*ii) at which of said plurality of locations said information content is to be displayed;*

*iii) when said information content is to be displayed for each location at which content is to be displayed; and*

*iv) how long said information content is to be displayed for each location at which content is to be displayed;*

*a computerized device situated at each one of said plurality of locations, each computerized device being electronically coupled to said computerized control center; and*

*a means for displaying images in accordance with said exposure list assocaited with each one of said computerized devices.*

* * * * *

UNITED STATES PATENT AND TRADEMARK OFFICE

CERTIFICATE OF CORRECTION

PATENT NO. : RE 39,470 E
APPLICATION NO. : 09/821969
DATED : January 16, 2007
INVENTOR(S) : Mats Hylin It is certified that error appears in the above-identified patent and that said Letters Patent is hereby corrected as shown below:

Claim 5, line 65, delete “begin” and substitute --being--

Claim 13, line 64, delete “specific” and substitute --specified--

Signed and Sealed this

Tenth Day of April, 2007

JON W. DUDAS
*Director of the United States Patent and Trademark Office*